(12) United States Patent
Dart et al.

(10) Patent No.: US 8,286,951 B2
(45) Date of Patent: Oct. 16, 2012

(54) WELL WATER AERATION SYSTEM

(76) Inventors: Frederick J. Dart, Mississauga (CA); John O. Richmond, Toronto (CA)

( * ) Notice: Subject to any disclaimer, the term of this patent is extended or adjusted under 35 U.S.C. 154(b) by 446 days.

(21) Appl. No.: 12/461,040

(22) Filed: Jul. 30, 2009

(65) Prior Publication Data
US 2010/0025866 A1 Feb. 4, 2010

Related U.S. Application Data

(60) Provisional application No. 61/129,940, filed on Jul. 31, 2008.

(51) Int. Cl.
*B01F 3/04* (2006.01)
(52) U.S. Cl. .......... 261/77; 261/93; 261/123; 166/177.7
(58) Field of Classification Search ............... 261/77, 261/91, 93, 121.1, 123; 166/174, 177.3, 166/177.7, 310, 350
See application file for complete search history.

(56) References Cited

U.S. PATENT DOCUMENTS

| | | | | |
|---|---|---|---|---|
| 1,144,342 | A * | 6/1915 | Andrews | 417/108 |
| 4,950,394 | A * | 8/1990 | Bernhardt et al. | 210/170.07 |
| 5,139,659 | A * | 8/1992 | Scott | 210/167.26 |
| 5,143,606 | A * | 9/1992 | Bernhardt | 210/170.07 |
| 5,143,607 | A * | 9/1992 | Bernhardt | 210/170.07 |
| 5,285,847 | A * | 2/1994 | Halper et al. | 166/177.7 |
| 6,032,931 | A * | 3/2000 | Plunkett | 261/77 |
| 6,103,123 | A * | 8/2000 | Gantzer | 210/605 |
| 6,174,108 | B1 * | 1/2001 | Suthersan | 210/170.07 |
| 6,284,133 | B1 * | 9/2001 | Schaefer et al. | 210/170.05 |
| 6,287,369 | B1 | 9/2001 | Osmund | |
| 7,048,861 | B2 * | 5/2006 | Beretta, III | 210/747.8 |

* cited by examiner

*Primary Examiner* — Charles Bushey

(57) ABSTRACT

An air injection system for aerating well water with a stream of air and having, a water circulation conduit extending down into the well, an aeration chamber extending upwardly within the well from the circulation conduit, at least one air and water discharge opening adjacent an upper end of the aeration chamber, a support disposed to support the aeration chamber at a predetermined depth in the well, and, an air compressor and a hose connected to supply air to a lower region of the aeration chamber, thus causing upward flow of air and water in the aeration chamber thereby inducing upward flow of water through said water circulation conduit from the bottom of the well to the aeration chamber.

10 Claims, 6 Drawing Sheets

WELL WATER AERATION SYSTEM

This application is based on U.S. Prov 61/129,940 filed Jul. 31, 2008 and claims priority.

FIELD OF THE INVENTION

The present invention relates to the field of water treatment for redaction and oxidation of dissolved gasses and minerals in water.

BACKGROUND OF THE INVENTION

Well water often contains objectionable impurities such as dissolved iron, manganese, methane gas, or hydrogen sulfide. If the water contains dissolved iron it will tend to oxidize when exposed to air, which causes the iron to precipitate out of solution. These precipitates cause rust-coloured stains, which are difficult to remove from porcelain surfaces such as toilet bowls, sinks and tubs. Methane is undesirable. The hydrogen sulfide is disagreeable because of its characteristic rotten egg odour. It is highly desirable to overcome these two contamination problems. Aeration of well water has been proposed in the past, but the systems available were expensive to install, and required frequent costly maintenance, to remain effective. An example is shown in U.S. Pat. No. 6,287,369 D W Osmund Sep. 11, 2001.

Another problem associated with well water is radon, a naturally occurring, water soluble radioactive gas that results from the breakdown of radium in soil, rock and water.

There are two known methods of treating water contaminated by radon gas, namely, by aeration, and by activated carbon filtration.

The aeration method involves introducing air into the water supply to increase the gas-liquid interface. This allows the contaminants dissolved in the water to diffuse into the gas phase, as disclosed in U.S. Pat. No. 6,287,369.

By similar principles excess methane gas can be displaced from the water and vented to atmosphere in a hazard free manner. This is desirable since methane can fuel biological activity and fouling of plumbing systems, and sulphide production in hot water tanks, as well as being inflammable.

According to Henry's law the infusion of air into the water will displace other gases such as methane, and the air and methane, and other gases, will then be vented to atmosphere.

As the gas mixture is vented from the water supply the recirculated water is ready for use.

In-well aeration contaminant removal systems are typically complex and thus relatively expensive to install and maintain. Therefore, a need exists for an improved in-well aeration system that overcomes the deficiencies of the prior art. More particularly, there is a need in the art for an inexpensive and energy efficient in-well aeration device for removing or releasing contaminants from well water.

BRIEF SUMMARY OF THE INVENTION

The invention provides an air injection system for aerating well water with a stream of air and having an upright circulation conduit having an upper end and a lower end, an upright aeration chamber being connected to the upper end of the circulation conduit, and an aeration inlet opening in said aeration chamber adjacent the lower end, and air and water discharge openings adjacent the upper end, an aeration air supply pipe connected to said aeration chamber at said lower end of said aeration chamber; a support connected to support said circulation conduit and said aeration chamber at a predetermined depth in the well water, and, an air compressor connected to supply air to said aeration chamber.

Preferably the water circulation conduit and the aeration chamber are parts of a continuous integral pipe, and in which the support is hollow and is comprised of the top end of said pipe.

Preferably the aeration chamber comprises a section of said pipe below said hollow support.

Preferably there is an air supply pipe connected between said hollow support and said aeration chamber, and wherein said air supply pipe supplies air to said hollow support. In one embodiment the aeration chamber is attached to the water circulation conduit by a sliding coupling. The sliding coupling permits the water circulation conduit to telescope relative to the aeration chamber.

Furthermore air is supplied to the aeration chamber via an air supply pipe separate from the hollow support.

In this case, as air flows up within the aeration chamber and then out of the upper end of the aeration chamber and some of it flows into the hollow support to maintain the hollow support on the surface of the well water.

In both embodiments there is an agitator moveably supported within the aeration chamber. When air and water flow up the aeration chamber, the agitator moves and dislodges any sediment or organisms that may be trapped in the aeration chamber or lodged on the inner surface.

In both embodiments there an air inlet valve at the lower end of the aeration chamber, the valve incorporating moveable portions, which flex as air is injected, to prevent accumulation of mineral deposits.

Typically the various pipes may be made in sections which can simply be screwed or joined together, as the assembly is being inserted down the well.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figure 1:
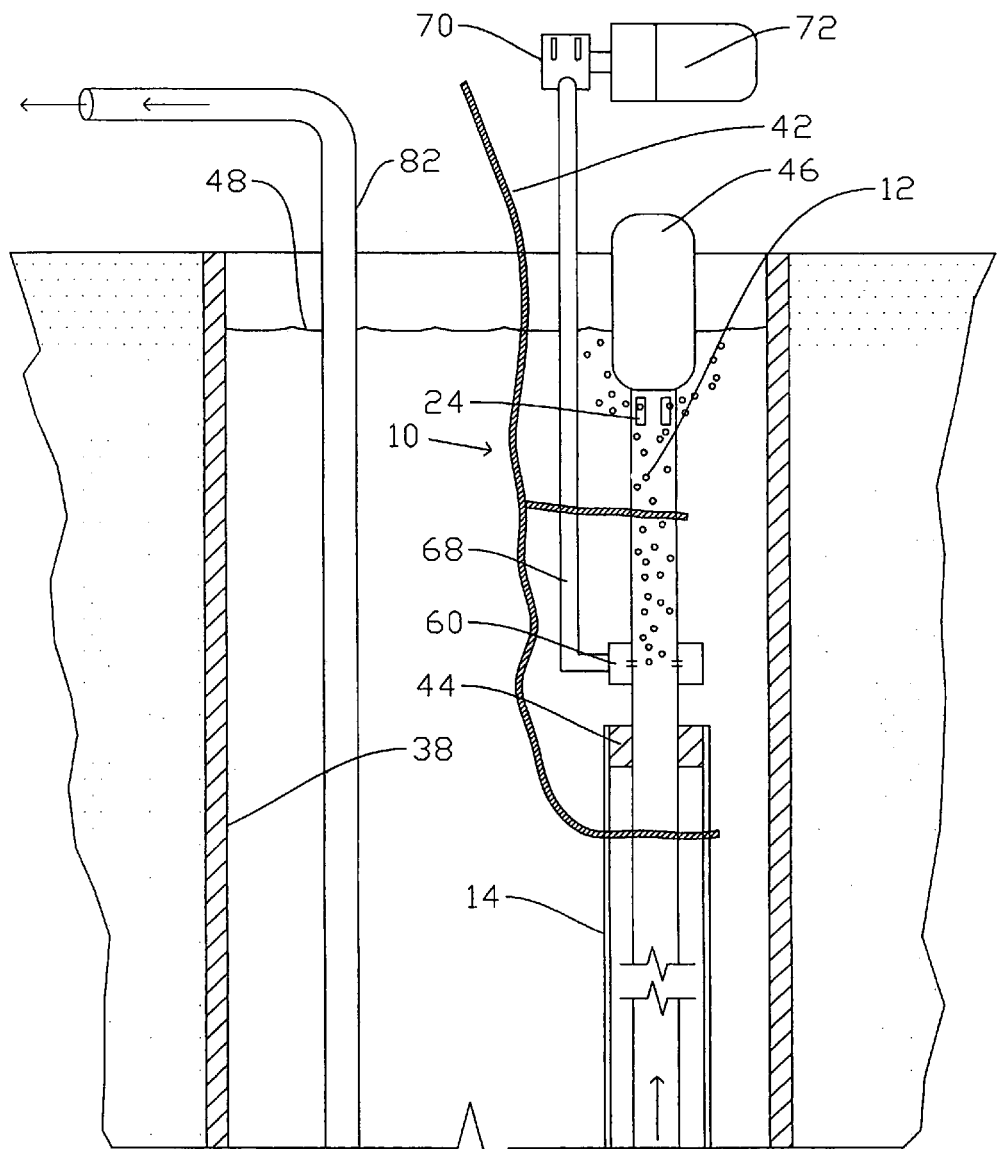
FIG. 1 is an elevation of the top portion of the well aeration system in the top of well.
Figure 2:
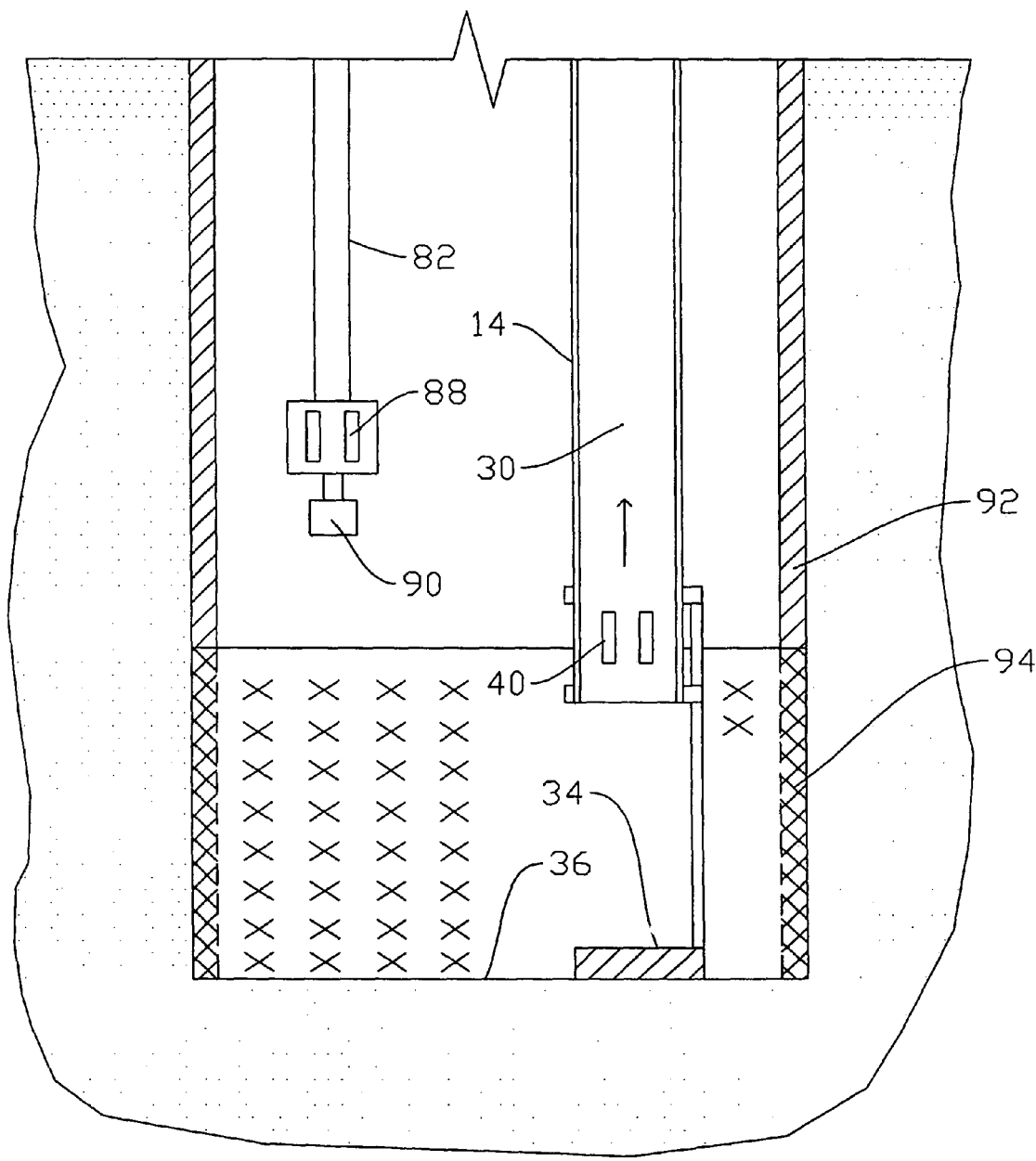
FIG. 2 is an elevation of the bottom portion of the well aeration system.

An air injection system for aerating well water with a stream of compressed air is shown in FIG. 1 and FIG. 2 illustrating an embodiment of invention.

FIG. 1 and FIG. 2 show the air injection system (10) comprised of a upright aeration chamber (12) and a water circulation conduit (14) in telescopic sliding relation. The aeration chamber (12) has a upper end (16) and a lower end. The aeration chamber (12) has an internal bore (20) that extends from the upper end of the aeration chamber (12) to the lower end of the aeration chamber (12). The aeration chamber (12) has a plurality of radial air and water discharge outlet slots (24) at its upper end.

The circulation conduit (14) has an internal bore (30) that extends from the upper end to the lower end of the circulation conduit (14). The lower end of the circulation conduit (14) has a weighted foot (34) positioned at or close to the bottom (36) of the well (38). The weighted foot (34) aligns the circulation conduit (14) in predominantly upright position inside the well (38). The weighted foot (34) holds the circulation conduit (14) close to or at the bottom of the well (38). In this embodiment the lower end of the water circulation conduit may optionally be slidable within the weighted foot.

A plurality of water intake slots (40) are disposed adjacent to the weighted foot (34) in the lower end of the circulation conduit (14). Typically, a filament member or tether rope (42) is disposed within the well (38). The rope (42) extends down from a fixed point outside the top of the well and is attached to the circulation conduit (14). The rope has some slack to permit limited telescopic movement of circulation conduit (14) relative to the aeration chamber (12). This may occur when there is a change in the water level in the well (38).

Figure 3:
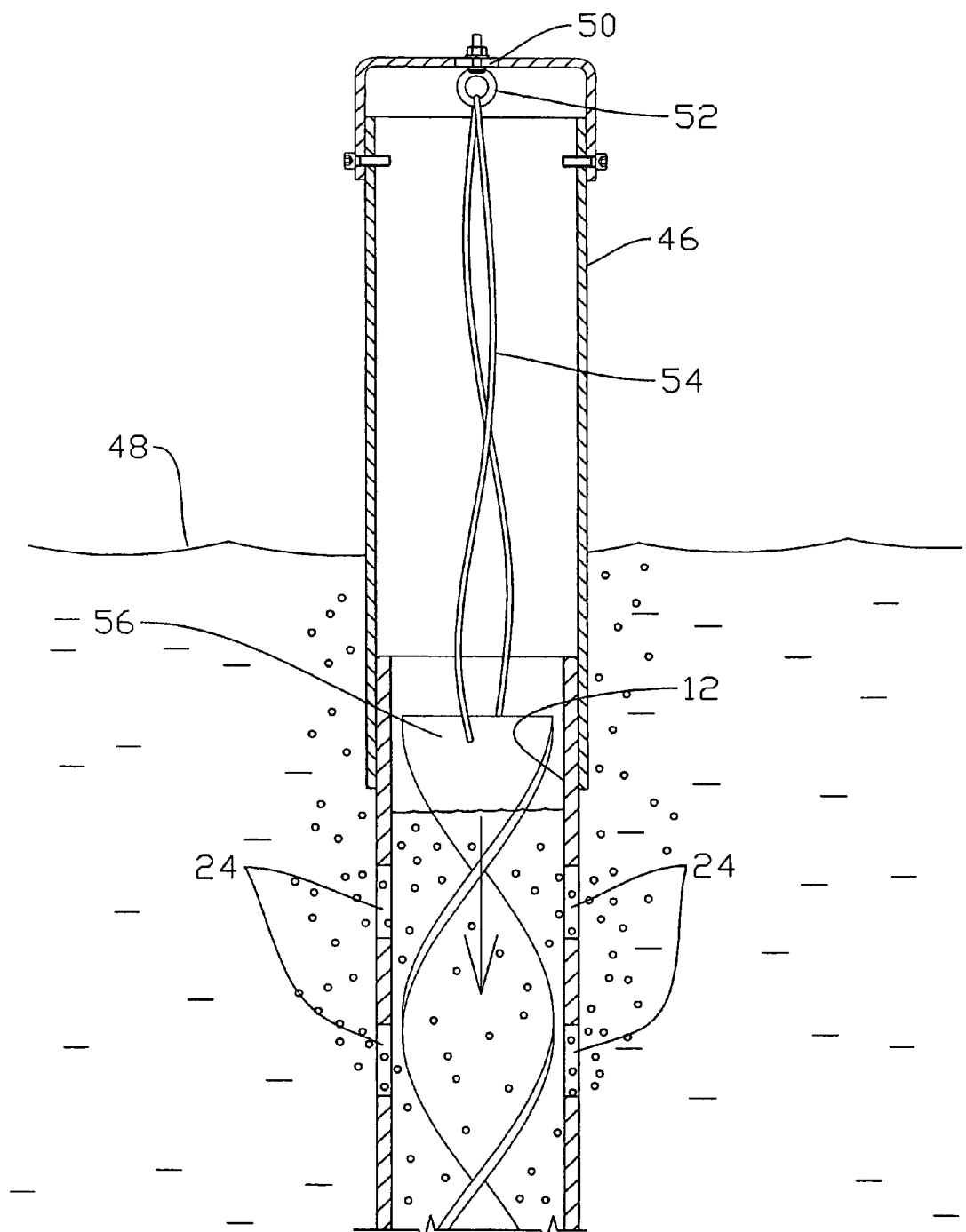
FIG. 3 is a vertical cross-section of the floating head.

A sealed sliding coupling (44) is disposed around the upper end (26) of the circulation conduit (14) (FIG. 3).

The sliding coupling (44) could be disposed inside the circulation conduit (14), or outside. The aeration chamber (12) and circulation conduit (14) are slidably connected together through the sealed sliding coupling (44).

A floating head or support (46) (FIG. 3), in this embodiment, is attached to the upper end of the aeration chamber (12). The support (46) is hollow being made of suitable material in a hollow shape. It fills with air, and floats on the surface of the water (48) in the well (38) following the level of the water in the well (38). The hollow support (46) is buoyant and supports the aeration chamber (12) and the sealed sliding coupling (44). As the level of the water in the well (38) changes, the hollow support (46) follows it and moves the aeration chamber (12) up or down.

A plurality of air and water discharge slots (24) are disposed around the upper end (16) of the aeration chamber (12) below to the hollow support (46). Slots (24) are all bevel cut on their horizontal surfaces, to prevent silt and deposits from accumulating around said slots. The hollow support (46) has an air release vent (50). The hollow support could also be a sealed chamber, or could even be of a solid buoyant material.

A hook (52) is also disposed at the top end of the hollow support (46). The hook (52) supports a filament or band (54), which supports a thin agitator, typically a twisted strip of bronze which acts as a scraper coil (56) disposed along the length of the aeration chamber (12). Coil (56) swings and twists as the air and water rise up through aeration chamber (12).

The coil being of bronze is itself of an anti bio fouling material, although other alloys will provide the same action.

As the coil twists the filament will twist and wind around and raise the coil.

When the filament is sufficiently twisted, it will reverse, and rotate the coil in the opposite direction, and permit the coil to move down again.

Thus the coil will both swing to and fro, will rotate first one way and then the other, and will also rise up and drop down. This agitates the water and inhibits organisms from colonizing the aeration chamber and blocking the flow of water. As coil (56) rotates and moves it scrapes the inner surface of the aeration chamber (12) and dislodges any sediment or organisms that may have become lodged there. Air and water are discharged via slots (24). The filament (54) has a protective skin, typically of adhesive such as hot melt glue, where it engages the hook (52), at the top and where it engages to coil (56) at the bottom.

This will prevent wear on the filament, and breakage. Some air escapes into hollow support (46), and maintains sufficient air therein to ensure that the hollow support floats on the surface of the well water. The hollow support could also be a sealed chamber, or could even be of a solid buoyant material, as mentioned above.

Figure 4:
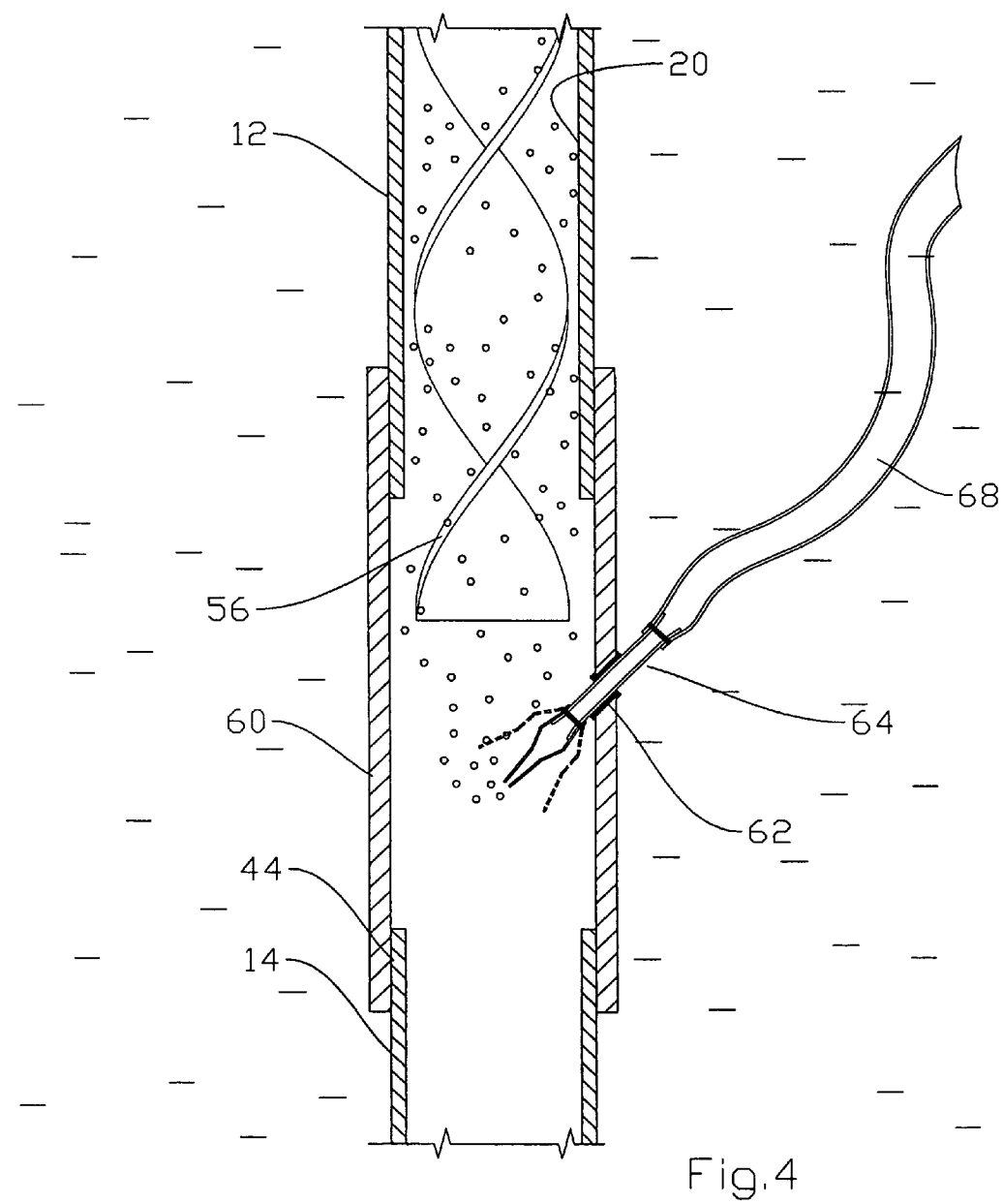
FIG. 4 is a vertical cross-section of the air injection collar.

An air injection collar (60), FIG. 4, forms part of sliding coupling (44) and has at least one radial bore (62). An air injection nozzle (64) is secured in the radial bore (62) of the air injection collar (60). Nozzle (64) will preferably be a type of flexible "duck bill" nozzle, which acts as a one way valve. It allows air to flow into the collar (60) but prevents back flow of water. The nozzle incorporates flexible portions, which will flex or flap in response to flow of air and flap open (FIG. 4 shown in phantom), and which will move to and fro. This will loosen and dislodge any mineral deposits which may tend to build up on the nozzle. A flexible air hose (68) connects with the air injection nozzle (64). An air compressor (70) driven by a motor (72) supplies air to hose (68). A timer (not shown) will control operation of the motor on an on/off cycle, for appropriate time periods. Upflow of air from air injection collar (60) passes up inside aeration chamber (12) and induces water to flow upwardly, within the aeration chamber. The air and water will exit from the slots (24). However this water must be replaced and thus the upflow of water from within the aeration chamber will induce water to flow into the lower end of the circulation conduit (14) and will draw water up into conduit (14), from the bottom of the well. Air and aerated water will flow out of aeration slots (24). The contents of an average well will thus be circulated, and treated with aeration within a predetermined period, typically about 4-8 hours. Some air will also flow up into flotation member (46). The air release vent (50) at the top of the hollow support (46) will allow excess air to escape, maintaining the hollow support (46) buoyant. Typically, a water supply pipe (82) to supply water from the well (38) is installed inside the well (38). The supply pipe (82) has an upper end and a lower end. The lower end of the supply pipe (82) has a plurality of water inlet slots (not shown) and a typical well pump (90).

The actual construction of the well is typical. Usually wells are lined with steel walls, (92). The walls (92) are forced down the well as it is being drilled. When the depth reaches an aquifer strata, a mesh screen (94) is then slid down within the steel walls, and is placed at the bottom of the well.

Figure 5:
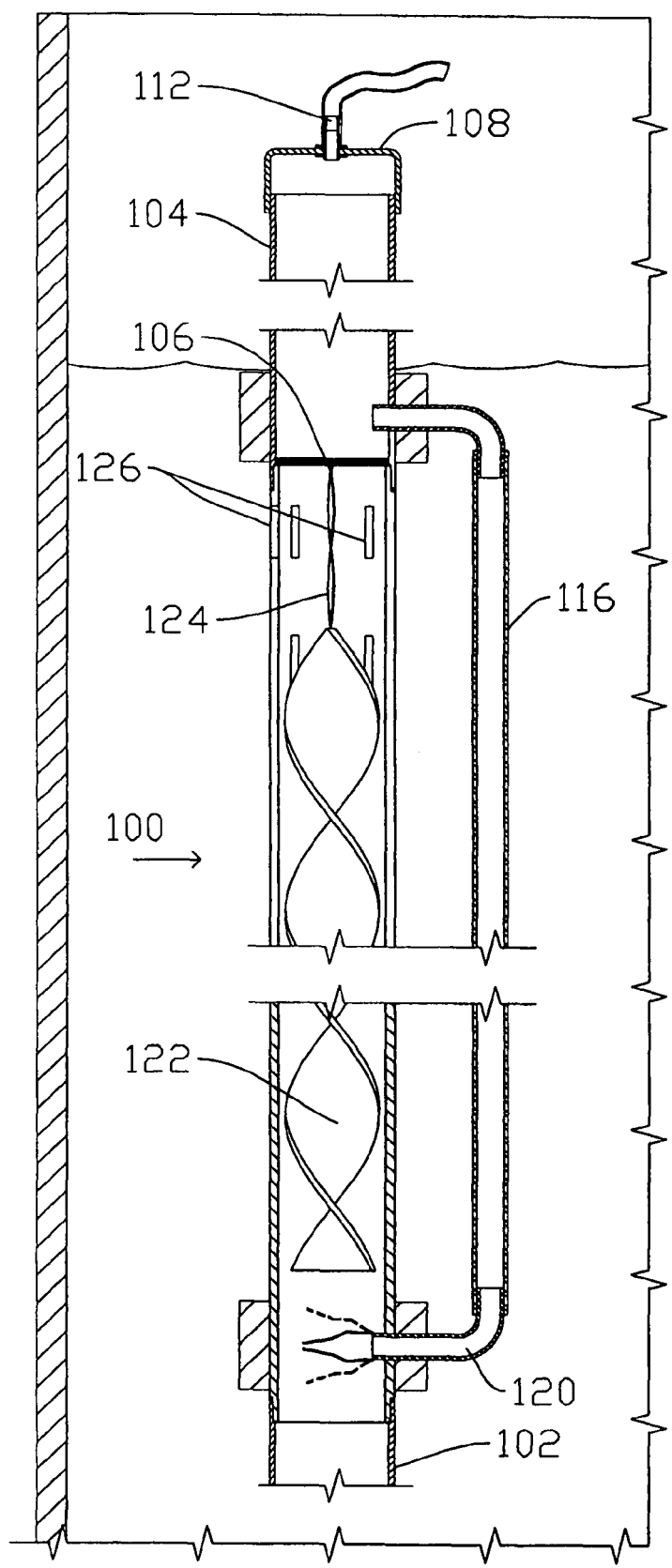
FIG. 5 is section of a further embodiment.

In a further embodiment, illustrated in FIG. 5, there is an aeration chamber (100) made integral with the water circulation conduit (102), as a continuous conduit.

This may be satisfactory for many wells, for example domestic wells, where the rise and fall of the water level is not so great as to require the sliding coupling.

In this case the support (104) need not be buoyant. It may be a variety of materials, and shapes adequate to provide a long service life in the environment. One form which is particularly suitable may be a simple hollow tube of synthetic plastic material.

It can joined to form an integral continuation of the aeration chamber and the water circulation conduit, so that the hollow support (104) is simply an endwise continuation of the aeration chamber (100), being of sufficient length to reach from the top of the well so as to at least position the aeration chamber below the water level. The hollow support is separated from the aeration chamber by a transverse wall (106). A cap (108) closes the hollow support (104).

In this embodiment the air compressor (110) is connected via air hose (112) directly to the cap (108) of the hollow support (104).

An air pipe (116) connects from hollow support (104) down to the lower end of aeration chamber (100). Air will thus be supplied through the hollow support (104) and pipe (116) down to the lower end of aeration chamber (100) and will then bubble up through the aeration chamber, in the same way as in FIGS. 3 and 4.

The air pipe (116) in this embodiment is shown on the exterior of said hollow support and said aeration chamber. It is conceivable that the air pipe could be run down from the wall (106), within the interior of said aeration chamber, if this was felt to be desirable. In this case air would simply bubble out of the lower end of such air hose and then rise up within the aeration chamber.

Air is supplied from the hollow support (104) via air pipe (116) and inlet nozzle (120) to the aeration chamber (100).

Within the aeration chamber (100) there is an agitator or scraper coil (122) similar to the agitator of FIG. 3. The agitator is suspended by a cord or wire (124). In this way as water and air pass up through aeration chamber (100) the agitator will swing and rotate and will also twist the cord causing it to rise, and then permitting it to fall. This will have the effect of dislodging debris, organisms and the like and minerals, which might otherwise become encrusted on the interior of the aeration chamber (100) and reduce its effectiveness, over time.

As air is supplied to the hollow support (104) by the compressor (110) air will flow down air pipe (116) to the lower end of the aeration chamber (100). There the air is injected into the water in the aeration chamber (100). Air will bubble up and flow out of discharge slots (126) at the upper end of aeration chamber (100). The movement of the air will cause water circulation, with water flowing upwardly through the aeration chamber (100) and out of the slots (126) and return into the well.

Water from the bottom of the well will thus be drawn up within water circulation conduit (102). This water will eventually reach the aeration chamber (100) and it will then be aerated, and treated and flow upwardly and out back into the well.

The circulation of the complete volume of well water may take a few hours, depending on the depth of the well. The aeration of the water will have the effect of removing excess gases and additionally oxidizing certain entrained minerals, particularly iron, to be rendered insoluble, for convenient removal by precipitation.

Figure 6:
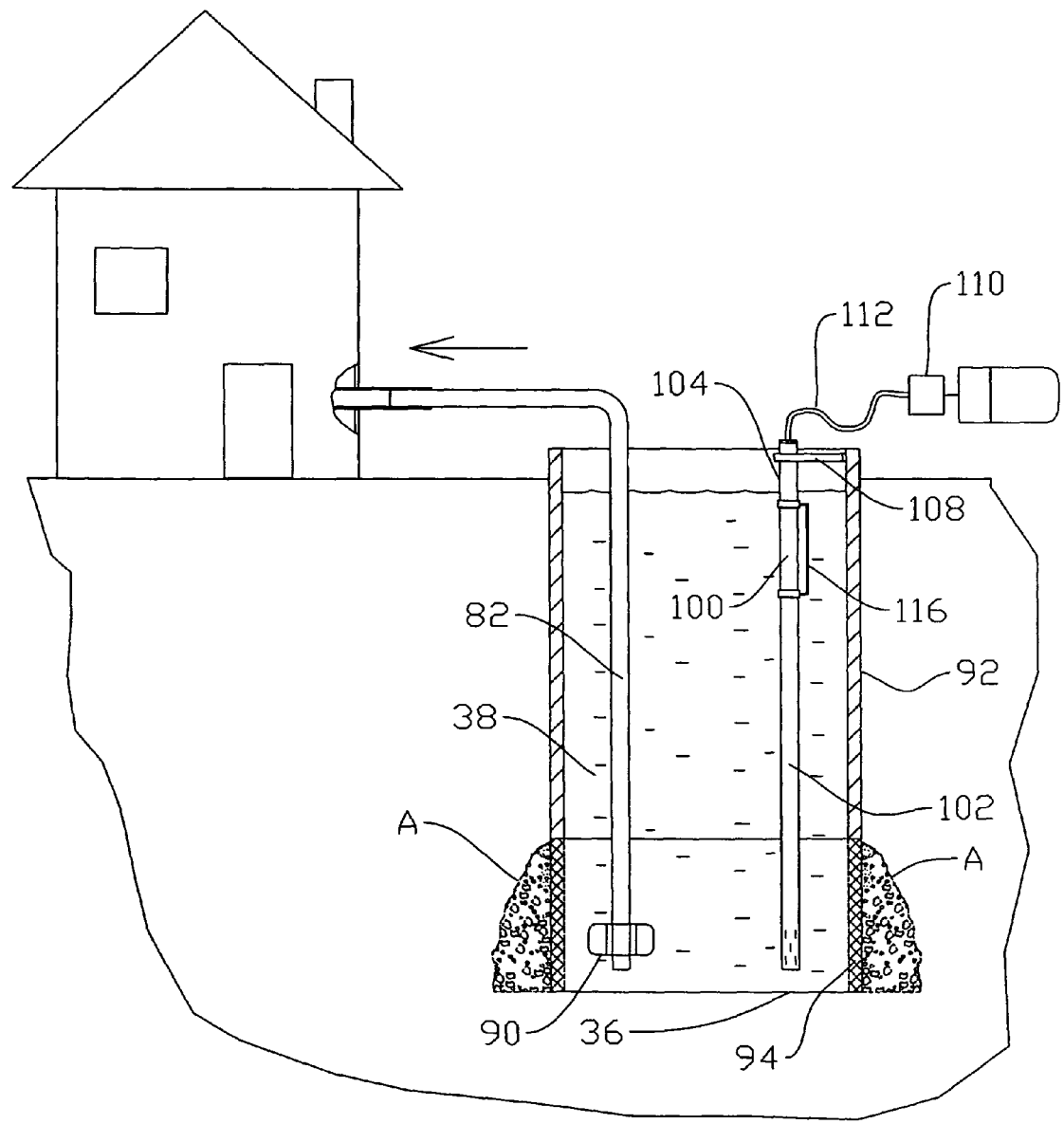
FIG. 6 is a schematic illustration of a typical domestic well installation.

In fact as the aeration continues it is found that the water yielding strata of the aquifer zone around the well will also be treated in the same way, as at (A) (FIG. 6). Soluble iron for example will thus be converted into insoluble iron salts, before it even enters the well itself. These insoluble salts will themselves be beneficial by absorbing biofouling organic nutrients from entering the well. Since they will be deposited in the earth and soil, they have the effect of acting as a biological treatment removing many undesirable contaminants as well as the iron itself filter, treating any soluble irons in the soil.

Thus over time the aquifer strata itself is converted into a form of oxygenated filter and will resist to a large extent the entry of soluble oxygen consuming contaminants such as iron into the well.

In this simplified system, the entire water circulation conduit (102), and aeration chamber (100) and hollow support (104) can all be made in sections and assembled on site as a continuous integral one piece structure, and the depth adjusted so as to locate the aeration chamber just below the surface of the well water. Clearly for deep wells, the water circulation conduit could be supplied in convenient lengths, and would simply be connected by well known pipe connectors to provide the required length. This will greatly simplify the installation, and provide a rugged simple structure have a long useful life with a minimum of servicing needs.

The entire structure may in this embodiment will be secured in a fixed depth within the well. Some suitable anchor or attachment such as clamp (128) can be used to anchor the structure in one place to the side of the well at the most suitable depth.

Water supply will be drawn up out of the well as before by pipe (82) and pump (90).

The supply pipe (82) may, in most cases be buried, underground for winter use.

The foregoing is a description of a preferred embodiment of the invention which is given here for the purposes of illustration. The invention is not to be taken as restricted to any of the specific features as described but comprehends all such variations as come within the scope of the following claims.

What is claimed:

1. An air injection system for aerating well water with a stream of air, a well having a top and a bottom and comprising;
   an upright water circulation conduit having upper and lower ends, extending down into the well, wherein said lower end of said water circulation conduit defines an open end, said open end being located adjacent said bottom of said well;
   an upright aeration chamber, having upper and lower ends, the lower end connecting with said upper end of said water circulation conduit,
   at least one air and water discharge opening adjacent said upper end of said aeration chamber;
   an agitator moveable within said aeration chamber in response to flow of air and water therein,
   a flexible filament supporting said agitator, said filament being twistable in response to air flow, to cause said agitator to rise and fall,
   a support supporting said aeration chamber in the well; and,
   an air compressor connected to supply air to a lower region of said aeration chamber.

2. An air injection system for aerating well water as claimed in claim 1 including an air pipe is located on the exterior of said aeration chamber.

3. An air injection system for aerating well water as claimed in claim 1 and further having water intake openings in said water circulation conduit adjacent the lower end thereof.

4. An air injection system for aerating well water as claimed in claim 1 including a hollow extension on said aeration chamber and a cap on the upper end thereof and an air hose coupling connected thereto for connection to said compressor.

5. An air injection system for aerating well water as claimed in claim 4 further having an air pipe extending between said extension and said aeration chamber, for injection of air into said aeration chamber.

6. An air injection system for aerating well water as claimed in claim 1, further having an anchor at the top of said support securing said support to said well.

7. An air injection system for aerating well water as claimed in claim 1 wherein said water circulation conduit comprises an elongated tube, and wherein said aeration chamber comprises an integral continuation of said tube.

8. An air injection system for aerating well water as claimed in claim 7 including an integral hollow extension extending upwardly from said aeration chamber, and a partition separating said aeration chamber from said hollow extension.

9. An air injection system for aerating well water as claimed in claim 8 including an air pipe connected to said hollow extension and extending downwardly along side said aeration chamber, and connecting with said aeration chamber adjacent said lower end thereof.

10. An air injection system for aerating well water as claimed in claim 9 and including an air supply conduit extending from said air compressor and connecting with said hollow extension.

\* \* \* \* \*